(12) United States Patent
Kim et al.

(10) Patent No.: US 12,319,115 B2
(45) Date of Patent: Jun. 3, 2025

(54) INTEGRATED THERMAL MANAGEMENT SYSTEM FOR FUEL CELL VEHICLE

(71) Applicants: HYUNDAI MOTOR COMPANY, Seoul (KR); KIA CORPORATION, Seoul (KR)

(72) Inventors: Ki Mok Kim, Busan (KR); Sang Shin Lee, Suwon-si (KR); Man Ju Oh, Yongin-si (KR); Keun Bok Lee, Hwaseong-si (KR); Jae Hyeok Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 294 days.

(21) Appl. No.: 17/989,371

(22) Filed: Nov. 17, 2022

(65) Prior Publication Data
US 2023/0364963 A1    Nov. 16, 2023

(30) Foreign Application Priority Data
May 12, 2022 (KR) .......................... 10-2022-0058495

(51) Int. Cl.
| | |
|---|---|
| *B60H 1/00* | (2006.01) |
| *H01M 8/04007* | (2016.01) |
| *H01M 10/625* | (2014.01) |
| *H01M 10/6569* | (2014.01) |
| *H01M 10/663* | (2014.01) |

(52) U.S. Cl.
CPC .... *B60H 1/00278* (2013.01); *H01M 8/04059* (2013.01); *H01M 10/625* (2015.04); *H01M 10/6569* (2015.04); *H01M 10/663* (2015.04); *H01M 2250/20* (2013.01)

(58) Field of Classification Search
CPC ............ B60H 1/00278; H01M 10/625; H01M 10/6569; H01M 10/663; H01M 8/04059; H01M 2250/20
See application file for complete search history.

(56) References Cited

U.S. PATENT DOCUMENTS

| | | | | |
|---|---|---|---|---|
| 11,279,258 B1 * | 3/2022 | Cohan | ............... | H01M 10/6561 |
| 11,358,493 B2 * | 6/2022 | Cohan | ..................... | B60L 58/26 |
| 2006/0053814 A1 * | 3/2006 | Naik | ..................... | B60H 1/3208 |
| | | | | 62/241 |
| 2006/0124275 A1 * | 6/2006 | Gosse | ..................... | B60H 1/03 |
| | | | | 165/42 |

(Continued)

FOREIGN PATENT DOCUMENTS

| | | | | |
|---|---|---|---|---|
| JP | 2014225981 A | * | 12/2014 | ......... B60H 1/00914 |
| KR | 2020-0145880 A | | 12/2020 | |

*Primary Examiner* — Nelson J Nieves
(74) *Attorney, Agent, or Firm* — MCDONNELL BOEHNEN HULBERT & BERGHOFF LLP

(57) ABSTRACT

An integrated thermal management system for a fuel cell vehicle includes a fuel cell coolant line configured to circulate first coolant through a fuel cell, a battery chiller, and an integrated chiller, an indoor air-conditioning refrigerant line configured to circulate refrigerant through a first compressor, an indoor condenser, an outdoor heat exchanger, and the integrated chiller, and a battery refrigerant line configured to circulate refrigerant through a second compressor, an outdoor condenser, and the battery chiller.

29 Claims, 15 Drawing Sheets

(56) References Cited

U.S. PATENT DOCUMENTS

| | | | |
|---|---|---|---|
| 2008/0145731 A1* | 6/2008 | Sakajo | H01M 8/04014 |
| | | | 429/442 |
| 2008/0245503 A1* | 10/2008 | Wilson | B60H 1/00371 |
| | | | 165/42 |
| 2008/0295535 A1* | 12/2008 | Robinet | H01M 10/663 |
| | | | 62/259.2 |
| 2010/0126438 A1* | 5/2010 | Kim | F28D 15/043 |
| | | | 165/104.26 |
| 2012/0304674 A1* | 12/2012 | Schwarzkopf | B60H 1/00385 |
| | | | 62/238.1 |
| 2013/0269911 A1* | 10/2013 | Carpenter | B60H 1/004 |
| | | | 165/104.19 |
| 2016/0107501 A1* | 4/2016 | Johnston | B60H 1/00278 |
| | | | 165/41 |
| 2016/0107508 A1* | 4/2016 | Johnston | B60H 1/00278 |
| | | | 237/12.3 A |
| 2017/0036514 A1* | 2/2017 | Umehara | H01M 8/241 |
| 2019/0168569 A1* | 6/2019 | Lee | B60L 58/26 |
| 2020/0108691 A1* | 4/2020 | Kim | F28D 9/0093 |
| 2021/0323378 A1* | 10/2021 | Kajiya | F28D 20/021 |
| 2022/0097487 A1* | 3/2022 | Jin | B60K 11/04 |
| 2022/0258558 A1* | 8/2022 | Lee | B60H 1/00921 |
| 2022/0266651 A1* | 8/2022 | Jeong | B60L 58/26 |
| 2022/0324295 A1* | 10/2022 | Kim | B60H 1/00278 |
| 2022/0355648 A1* | 11/2022 | Kim | B60H 1/143 |
| 2023/0104670 A1* | 4/2023 | Mothier | H01M 8/04037 |
| | | | 429/437 |
| 2023/0415593 A1* | 12/2023 | Lee | H01M 10/615 |
| 2024/0001734 A1* | 1/2024 | Mehta | F25B 49/02 |
| 2024/0109398 A1* | 4/2024 | Kim | B60H 1/00921 |
| 2024/0166089 A1* | 5/2024 | Tsuda | H01M 10/613 |

\* cited by examiner

INTEGRATED THERMAL MANAGEMENT SYSTEM FOR FUEL CELL VEHICLE

CROSS REFERENCE TO RELATED APPLICATIONS

This application claims the priority benefit of Korean Patent Application No. 10-2022-0058495, filed on May 12, 2022, in the Korean Intellectual Property Office, the disclosure of which is incorporated herein by reference.

BACKGROUND

1. Field

The present disclosure relates to an integrated thermal management system for a fuel cell vehicle, and more particularly to an integrated thermal management system for a fuel cell vehicle capable of implementing various heat exchange modes using refrigerant for indoor air conditioning, coolant for an electric part, coolant for a fuel cell, coolant for a battery, and refrigerant for the battery, thereby improving the overall energy efficiency of the vehicle.

2. Description of the Related Art

Recently, with increased concern about environmental problems caused by internal combustion engine vehicles, environmentally friendly vehicles, such as electric vehicles and fuel cell vehicles, have been actively developed.

In the case of a conventional internal combustion engine vehicle, an indoor space may be heated using waste heat from an engine, and thus separate energy for heating is not necessary. However, in the case of an environmentally friendly vehicle, such as an electric vehicle or a fuel cell vehicle, a heat source such as an engine is not provided, and thus a separate energy source is necessary in order to perform indoor heating, which deteriorates efficiency of use of electricity.

Therefore, unlike an air-conditioning device of an internal combustion engine vehicle, an air-conditioning device of an environmentally friendly vehicle, such as an electric vehicle or a fuel cell vehicle, employs a heat pump system.

Generally, a heat pump system is a cooling/heating system that transfers low-temperature heat to a high-temperature side or transfers high-temperature heat to a low-temperature side using the heat of evaporation of a refrigerant or the heat of condensation of a refrigerant. During heating, the heat pump system absorbs external heat or waste heat and transfers the same to the indoor space.

In the case of an environmentally friendly vehicle, such as an electric vehicle or a fuel cell vehicle, thermal management of electrical parts, such as a battery and a motor, as well as an air-conditioning device has recently been required. Particularly, in the case of a fuel cell vehicle, thermal management of a fuel cell stack has also come to be required.

An indoor space, a battery, an electric part, and a fuel cell stack, which are applied to an environmentally friendly vehicle, such as an electric vehicle or a fuel cell vehicle, have different air-conditioning requirements. Therefore, there is need for a technology that can independently respond to different air-conditioning requirements and can effectively satisfy the same in order to achieve maximum energy savings. Therefore, the concept of integrated thermal management for a vehicle, which can improve heating efficiency by performing independent thermal management of individual components of the vehicle and performing overall thermal management in an integrated manner, has been proposed.

In order to perform integrated thermal management for a vehicle, it is necessary to modularize complicated coolant lines, refrigerant lines, and components. Therefore, there is need for modularization technology that can simplify a manufacturing process and produce a compact package.

In an integrated thermal management system for a vehicle equipped with a heat pump system, when the outside air temperature is low, the heat pump system may not operate properly. In order to prevent this problem, various types of heaters may be separately provided in the integrated thermal management circuit of the vehicle. For example, a water-heating heater for raising the temperature of a battery is provided in a coolant line, and an air-heating heater for heating an indoor space is provided in a refrigerant line.

However, provision of the water-heating heater for raising the temperature of a battery and the air-heating heater for heating an indoor space is not efficient from the aspect of thermal management, and increases the number of parts. Therefore, there is need for a solution to reduce the number of parts through the concept of an integrated thermal management circuit.

The information disclosed in this Background section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide an integrated thermal management system for a fuel cell vehicle capable of implementing various heat exchange modes using refrigerant for indoor air conditioning, coolant for an electric part, coolant for a fuel cell, coolant for a battery, and refrigerant for the battery, thereby improving the overall energy efficiency of the vehicle.

In accordance with an aspect of the present disclosure, the above and other objects can be accomplished by the provision of an integrated thermal management system for a fuel cell vehicle, including a fuel cell coolant line, which circulates first coolant through a fuel cell generating electric power using hydrogen and air, a battery chiller exchanging heat with a battery using coolant, and an integrated chiller, an indoor air-conditioning refrigerant line, which circulates refrigerant through a first compressor suctioning and compressing the refrigerant, an indoor condenser provided in an indoor air-conditioning device to generate hot air and supply the hot air to an indoor space, an outdoor heat exchanger performing heat exchange between outside air and the refrigerant, and the integrated chiller, and a battery refrigerant line, which circulates refrigerant through a second compressor suctioning and compressing the refrigerant, an outdoor condenser performing heat exchange between the compressed refrigerant and outside air to dissipate heat, and the battery chiller.

In the fuel cell coolant line, the battery chiller may be connected in parallel to a point between the fuel cell and the integrated chiller via a first valve.

In the fuel cell coolant line, a fuel cell radiator may be connected in parallel to the fuel cell via a second valve. The integrated thermal management system may further include a battery coolant line configured to circulate second coolant through the battery chiller and the battery.

The integrated thermal management system may further include an electric part coolant line configured to circulate third coolant through a vehicle electric part and the integrated chiller.

In the electric part coolant line, an electric part radiator may be connected in parallel to the vehicle electric part via a third valve.

The integrated chiller may include an electric part chiller and a fuel cell chiller, connected in parallel to each other via a fourth valve in a refrigerant line. The electric part chiller may be connected to the electric part coolant line, and the fuel cell chiller may be connected to the fuel cell coolant line.

The integrated chiller and an evaporator may be connected in parallel to each other between the outdoor heat exchanger and the first compressor in the indoor air-conditioning refrigerant line.

The integrated chiller may include a fuel cell chiller and an electric part chiller, connected in series to each other. The electric part chiller may be connected to the electric part coolant line, and the fuel cell chiller may be connected to the fuel cell coolant line. A fifth valve may be provided upstream of the integrated chiller, and a branch line, branching from a point between the indoor condenser and the outdoor heat exchanger and connected to the fifth valve, may be provided in the refrigerant line.

The integrated thermal management system may further include a bypass line bypassing the integrated chiller and connected to the fifth valve. The bypass line may be connected to the indoor air-conditioning refrigerant line at a point upstream of the first compressor.

The fuel cell chiller may be disposed upstream of the electric part chiller, and the refrigerant discharged from the fuel cell chiller may be introduced into the electric part chiller.

The coolant in the fuel cell coolant line may flow through the fuel cell, the battery chiller, and the integrated chiller in that order.

In the indoor air-conditioning refrigerant line, a refrigerant heater may be provided between the first compressor and the indoor condenser of the indoor air-conditioning device.

In the fuel cell cooling mode, both the first compressor and the second compressor may be driven, and the coolant, having passed through the fuel cell in the fuel cell coolant line, may be cooled by the battery chiller and the integrated chiller.

In the indoor heating mode, the first compressor may be driven, and the refrigerant, having passed through the indoor condenser in the indoor air-conditioning refrigerant line, may absorb heat through the outdoor heat exchanger and the integrated chiller.

In the battery-temperature-increasing mode, the coolant may circulate through the battery coolant line, and the coolant, having passed through the fuel cell in the fuel cell coolant line, may dissipate heat through the battery chiller.

In the fuel cell cooling mode, both the first compressor and the second compressor may be driven, and the coolant, having passed through the fuel cell in the fuel cell coolant line, may be cooled by the battery chiller and the fuel cell chiller.

In the indoor heating mode, the first compressor may be driven, and the refrigerant, having passed through the indoor condenser in the indoor air-conditioning refrigerant line, may absorb heat through the outdoor heat exchanger, and may absorb heat while flowing through the fuel cell chiller via the fourth valve.

In the indoor heating mode, the first compressor may be driven, the refrigerant, having passed through the indoor condenser in the indoor air-conditioning refrigerant line, may absorb heat through the outdoor heat exchanger and may absorb heat while flowing through the electric part chiller via the fourth valve, and the coolant, having passed through the fuel cell in the fuel cell coolant line, may dissipate heat through the battery chiller.

In the indoor heating mode, the first compressor may be driven, a portion of refrigerant, having passed through the indoor condenser in the indoor air-conditioning refrigerant line, may absorb heat through the outdoor heat exchanger, and the remaining portion of the refrigerant may absorb heat while flowing through the fuel cell chiller and the electric part chiller via the branch line and the fifth valve.

In the indoor heating mode, when the temperature of the fuel cell is below a predetermined value and needs to be increased, the refrigerant may not be expanded in the fuel cell chiller, and may be expanded in the electric part chiller. The predetermined value may vary depending on circumstances such as cold start of the fuel cell, power generation load, or external temperature, for example.

In accordance with another aspect of the present disclosure, there is provided an integrated thermal management system for a fuel cell vehicle, including a fuel cell coolant line, which circulates first coolant through a fuel cell generating electric power using hydrogen and air and an integrated chiller, an indoor air-conditioning refrigerant line, which circulates refrigerant through a first compressor suctioning and compressing the refrigerant, an indoor condenser provided in an indoor air-conditioning device to generate hot air and supply the hot air to an indoor space, an outdoor heat exchanger performing heat exchange between outside air and the refrigerant, and the integrated chiller, a battery chiller configured to exchange heat with a battery using coolant, and a battery refrigerant line, which circulates refrigerant through a second compressor suctioning and compressing the refrigerant, an outdoor condenser performing heat exchange between the compressed refrigerant and outside air to dissipate heat, and the battery chiller.

The integrated thermal management system may further include an electric part coolant line configured to circulate third coolant through a vehicle electric part and the integrated chiller.

The integrated chiller may include a fuel cell chiller and an electric part chiller, connected in series to each other. The electric part chiller may be connected to the electric part coolant line, and the fuel cell chiller may be connected to the fuel cell coolant line. A fifth valve may be provided upstream of the integrated chiller, and a branch line, branching from a point between the indoor condenser and the outdoor heat exchanger and connected to the fifth valve, may be provided in a refrigerant line.

The integrated thermal management system may further include a bypass line bypassing the integrated chiller and connected to the fifth valve. The bypass line may be connected to the indoor air-conditioning refrigerant line at a point upstream of the first compressor.

The fuel cell chiller may be disposed upstream of the electric part chiller, and the refrigerant discharged from the fuel cell chiller may be introduced into the electric part chiller.

In the indoor heating mode, the first compressor may be driven, a portion of refrigerant, having passed through the indoor condenser in the indoor air-conditioning refrigerant line, may absorb heat through the outdoor heat exchanger, and the remaining portion of the refrigerant may absorb heat while flowing through the fuel cell chiller and the electric part chiller via the branch line and the fifth valve.

In the indoor heating mode, when the temperature of the fuel cell is below a predetermined value and needs to be increased, the refrigerant may not be expanded in the fuel cell chiller, and may be expanded in the electric part chiller.

In the indoor air-conditioning refrigerant line, a refrigerant heater may be provided between the first compressor and the indoor condenser of the indoor air-conditioning device. In the indoor heating mode, when the temperature of the fuel cell is below a predetermined value and needs to be increased, the refrigerant heater may be driven, and the refrigerant may not be expanded in the fuel cell chiller, and may be expanded in the electric part chiller.

The integrated chiller may include an electric part chiller and a fuel cell chiller, connected in parallel to each other via a fourth valve in the refrigerant line. The electric part chiller may be connected to the electric part coolant line, and the fuel cell chiller may be connected to the fuel cell coolant line.

BRIEF DESCRIPTION OF THE FIGURES

The above and other objects, features, and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
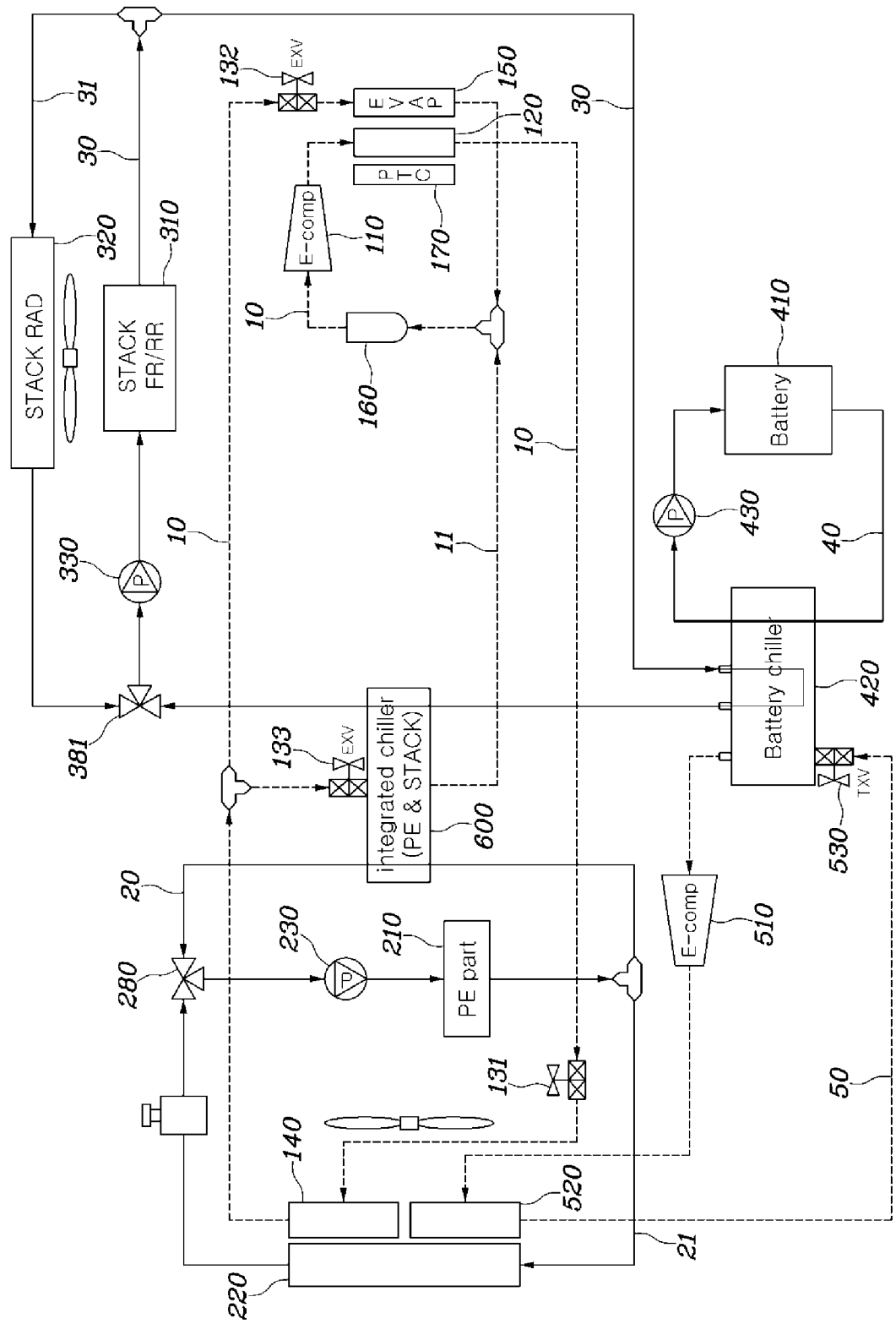
FIGS. 1, 2, and 3 are diagrams showing the operation of an integrated thermal management system for a fuel cell vehicle according to a first embodiment of the present disclosure.
Figure 2:
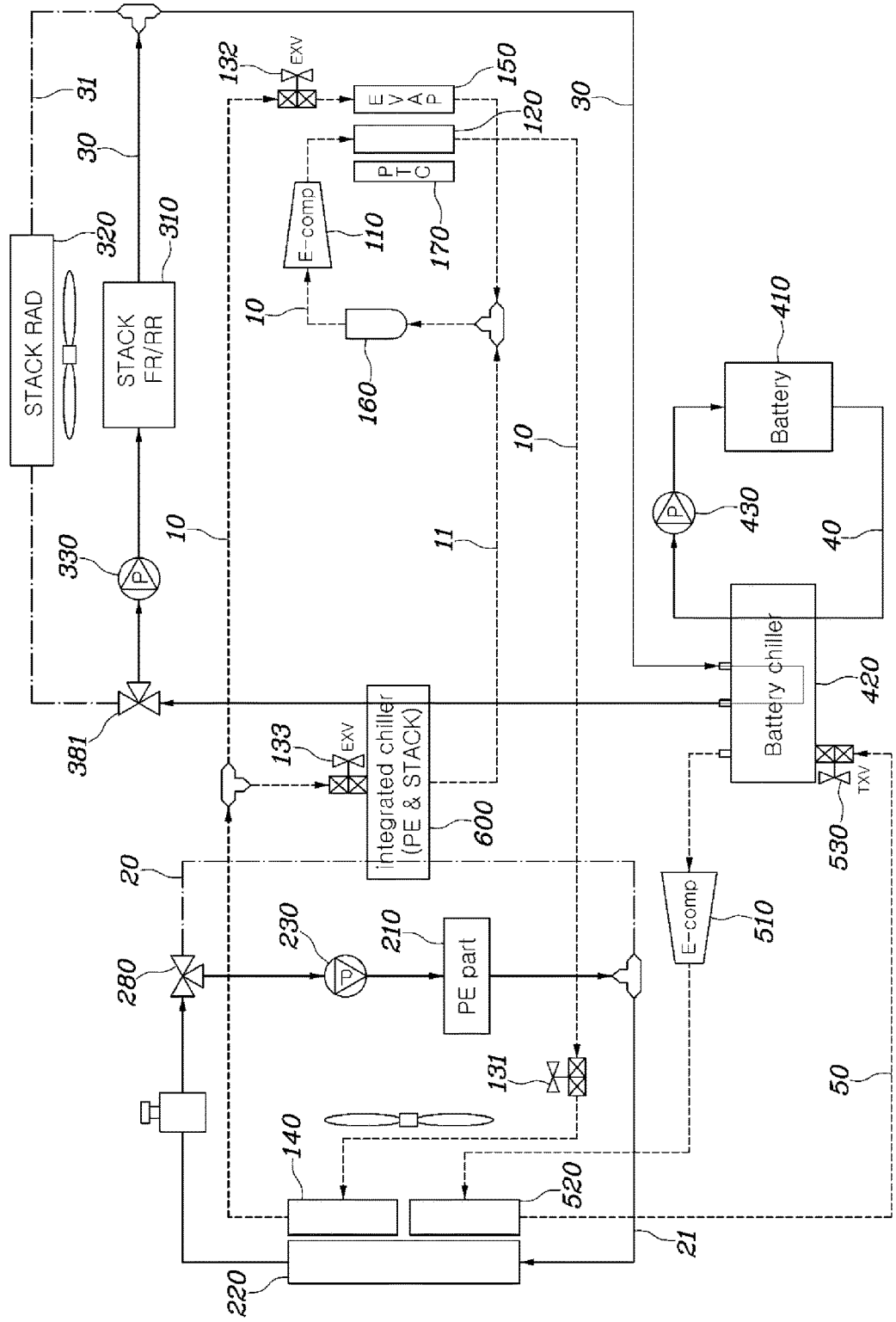
Figure 3:
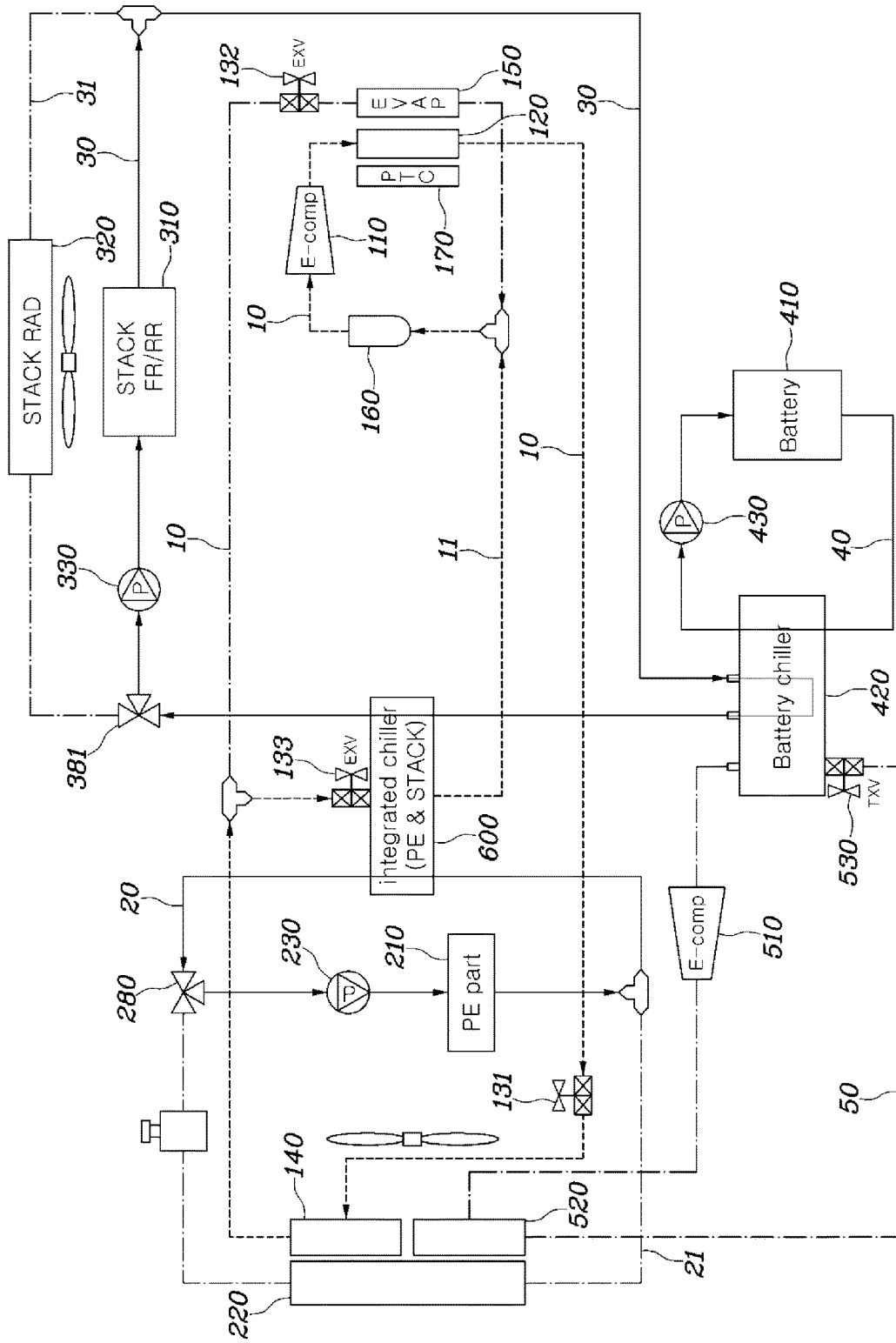
Figure 4:
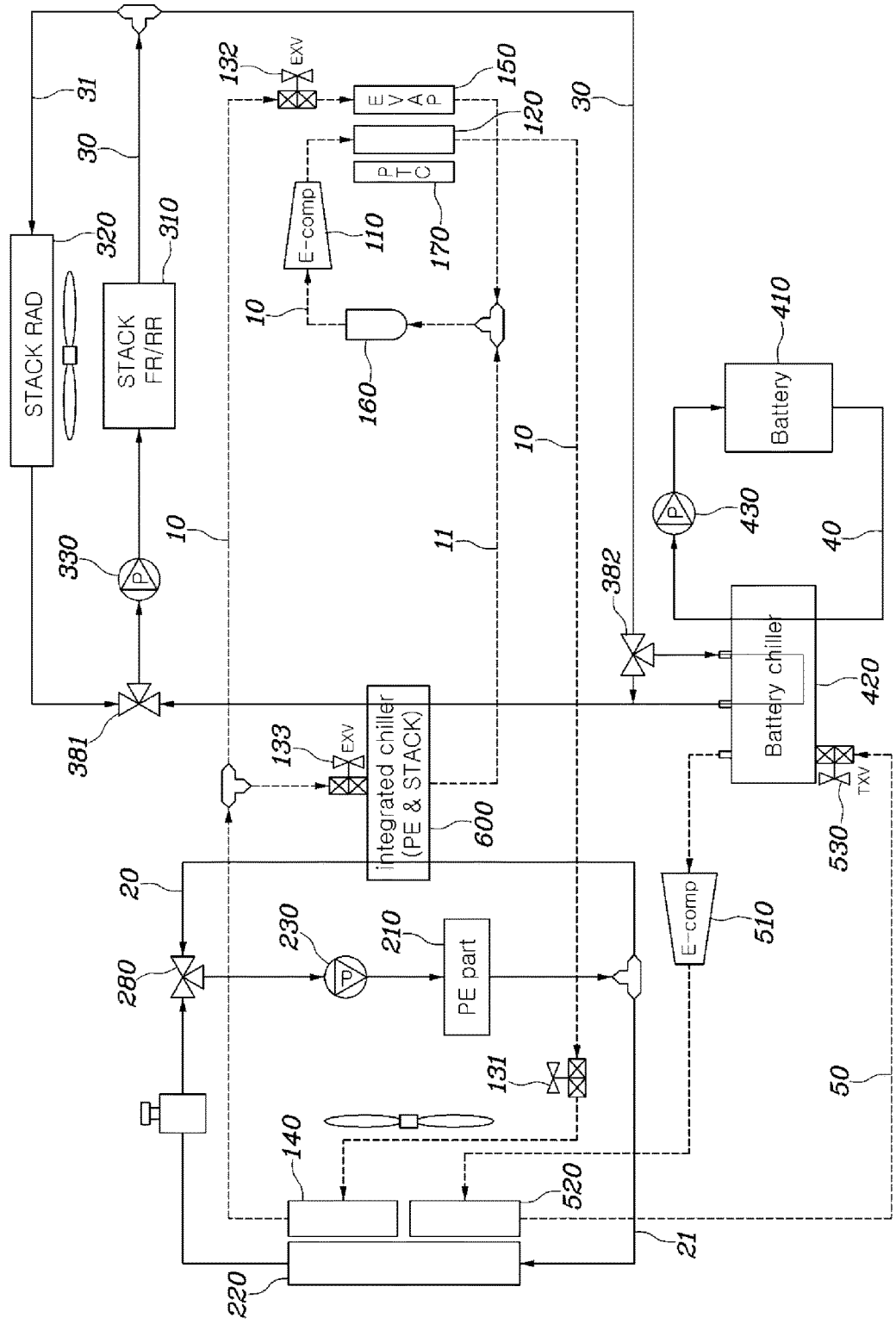
FIG. 4 is a diagram showing an integrated thermal management system for a fuel cell vehicle according to a second embodiment of the present disclosure.
Figure 5:
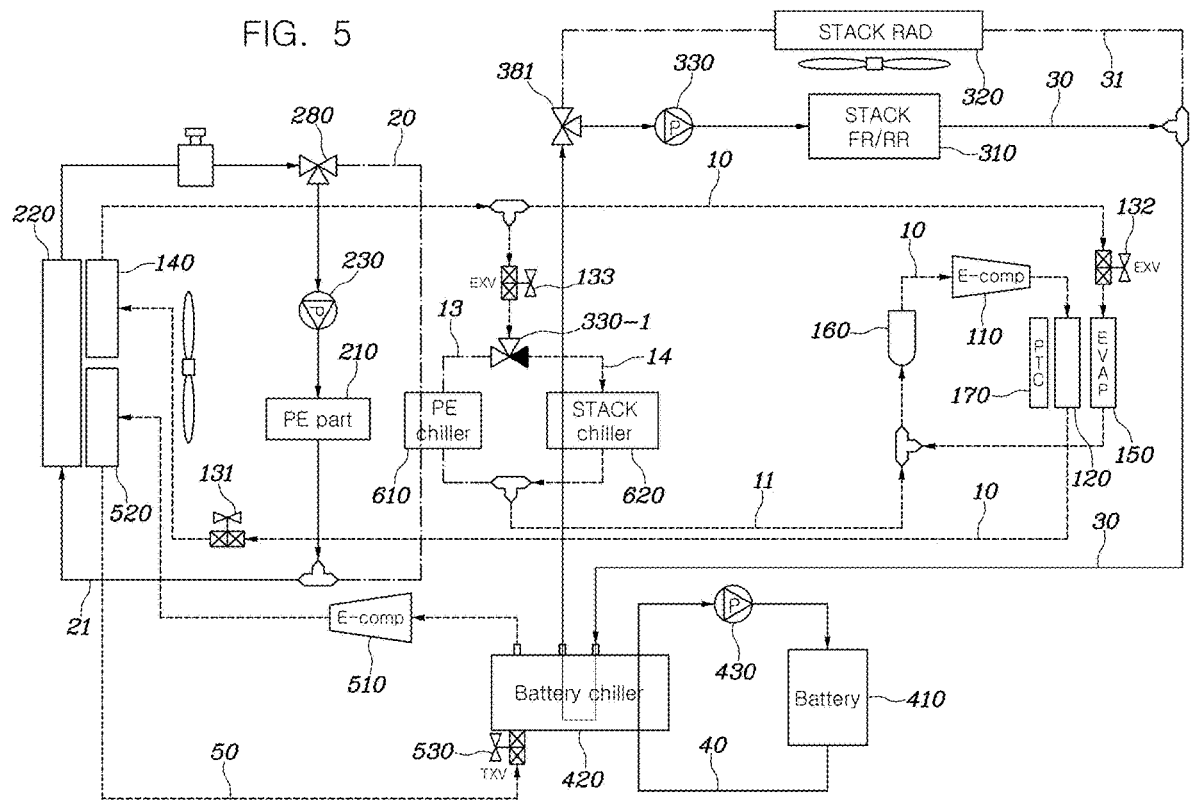
FIGS. 5, 6, and 7 are diagrams showing the operation of an integrated thermal management system for a fuel cell vehicle according to a third embodiment of the present disclosure.
Figure 6:
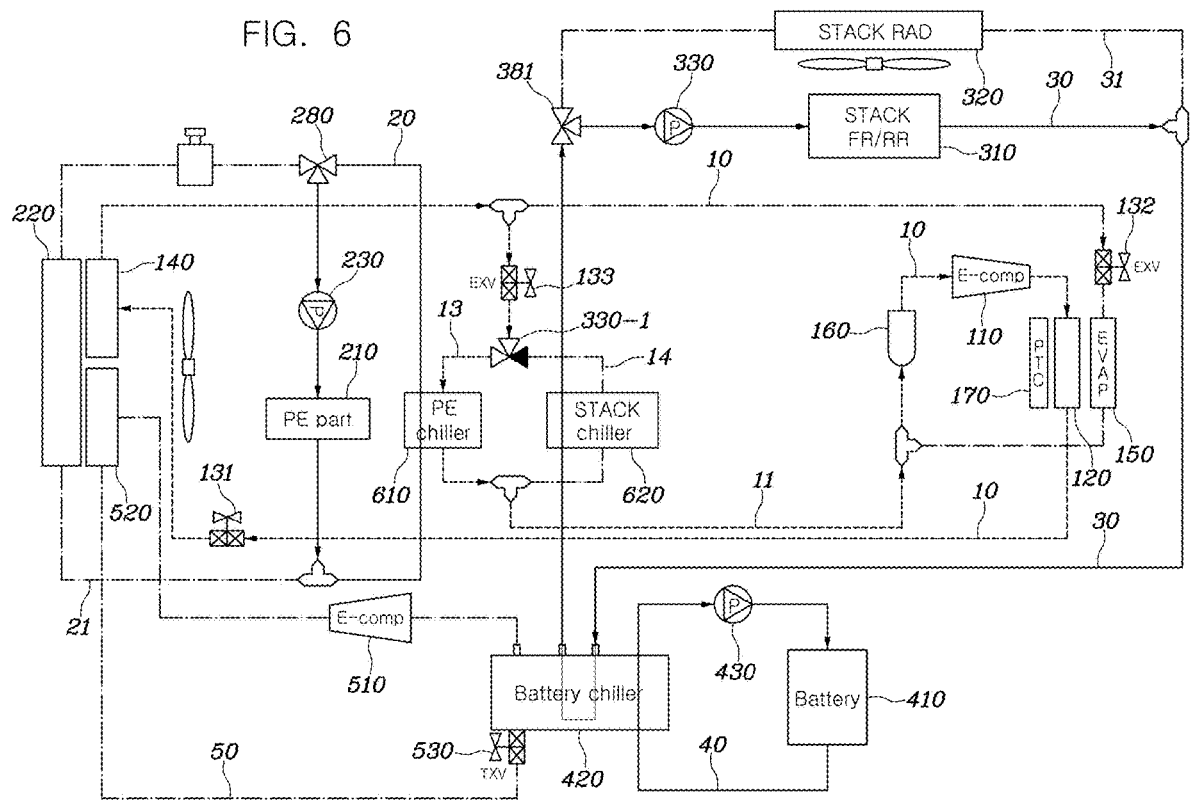
Figure 7:
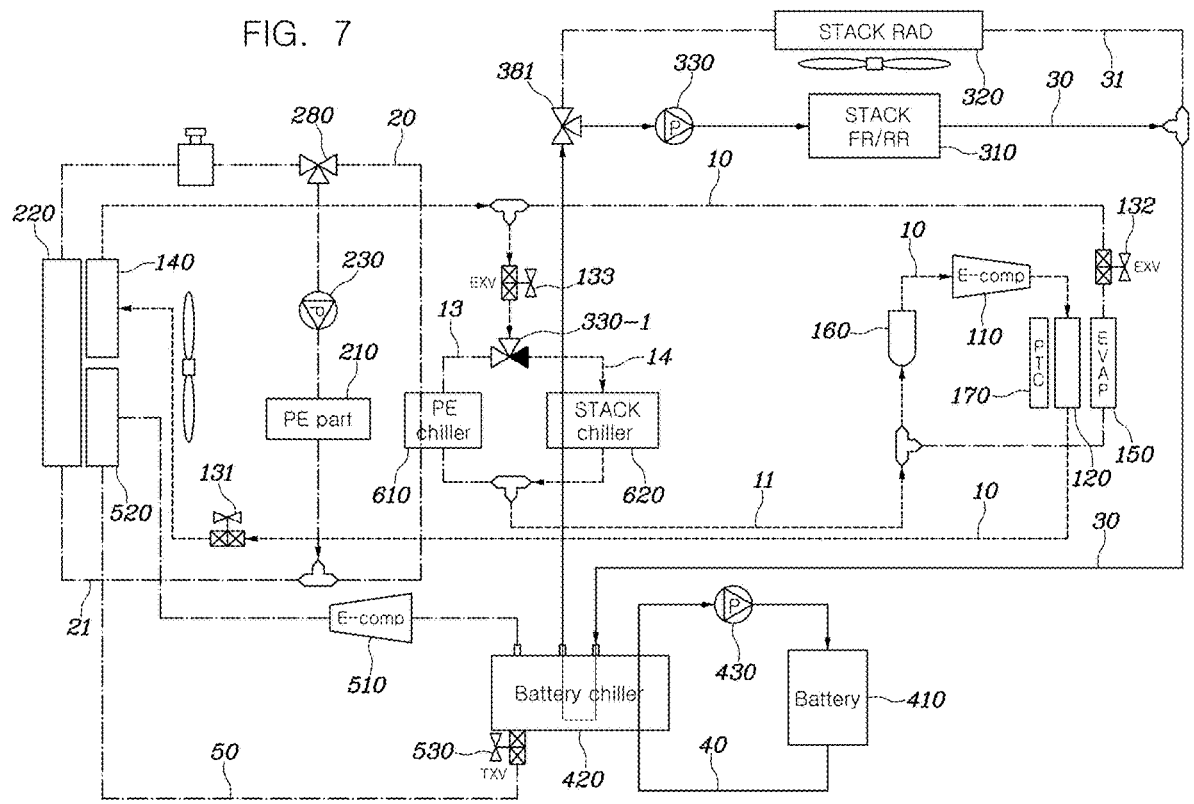

FIGS. 1 to 3 are diagrams showing the operation of an integrated thermal management system for a fuel cell vehicle according to a first embodiment of the present disclosure. FIG. 4 is a diagram showing an integrated thermal management system for a fuel cell vehicle according to a second embodiment of the present disclosure. FIGS. 5 to 7 are diagrams showing the operation of an integrated thermal management system for a fuel cell vehicle according to a third embodiment of the present disclosure. FIGS. 8 to 11 are diagrams showing the operation of an integrated thermal management system for a fuel cell vehicle according to a fourth embodiment of the present disclosure.

Figure 12:
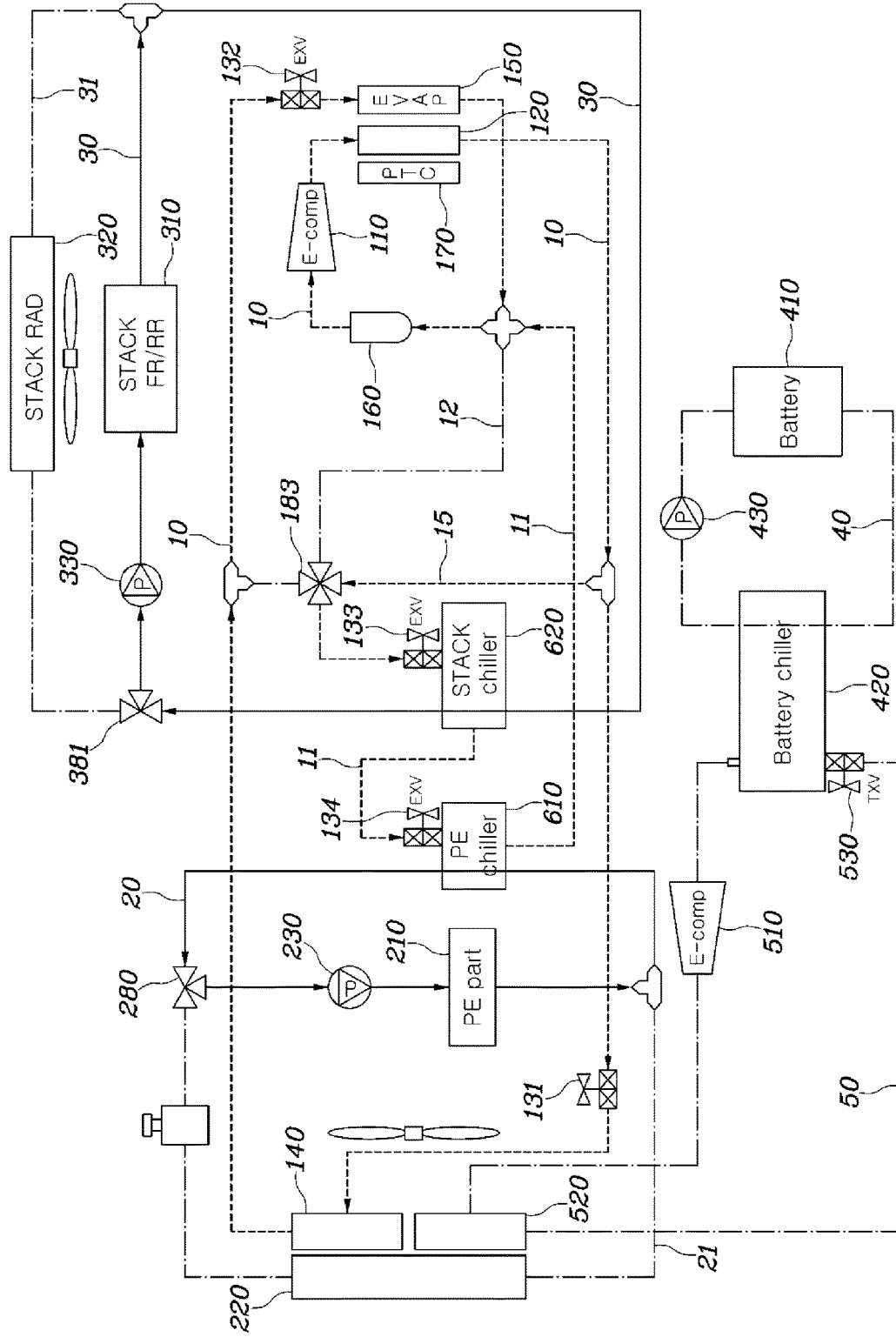
FIGS. 12 and 13 are diagrams showing the operation of an integrated thermal management system for a fuel cell vehicle according to a fifth embodiment of the present disclosure.
Figure 13:
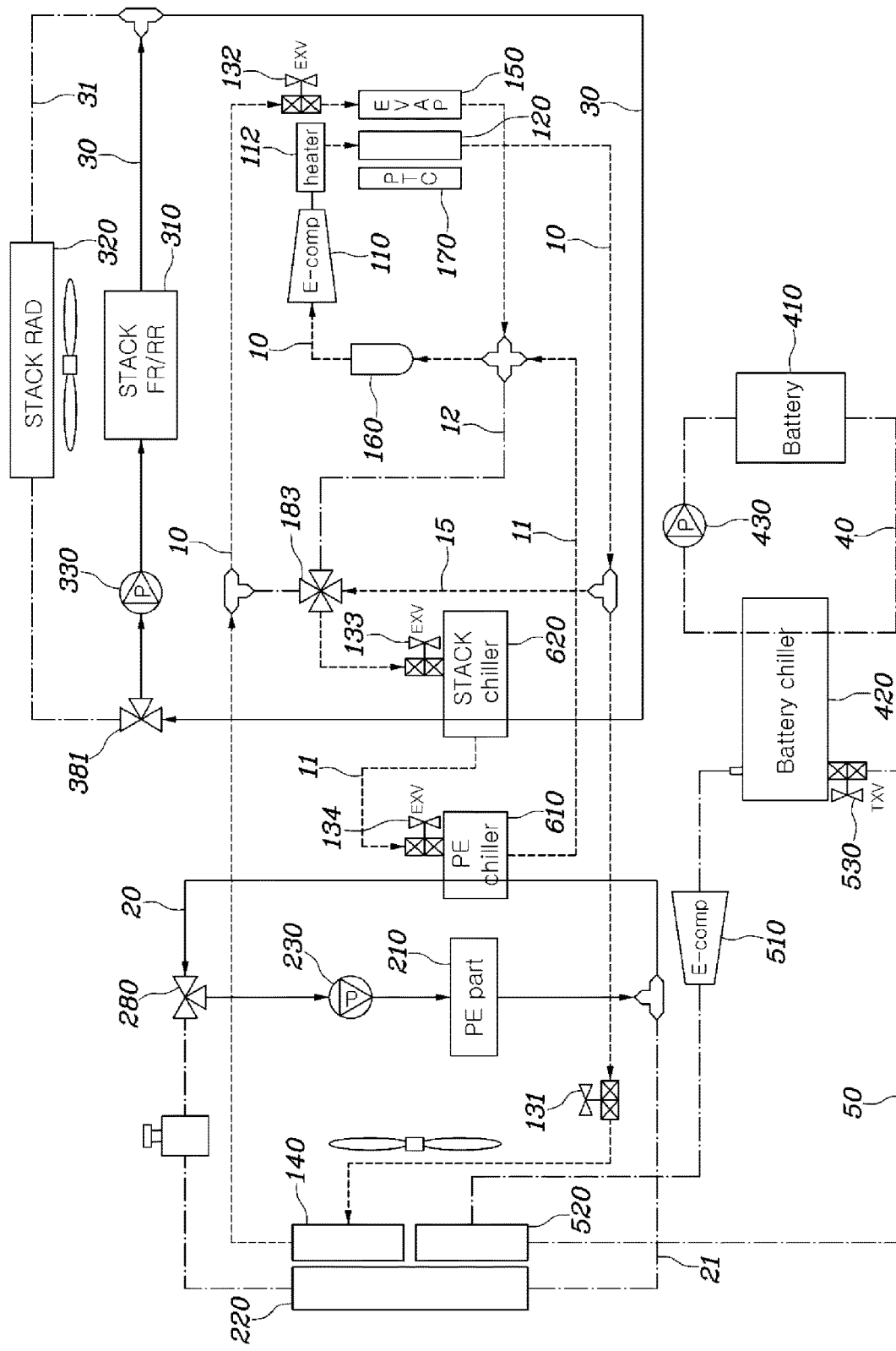
Figure 14:
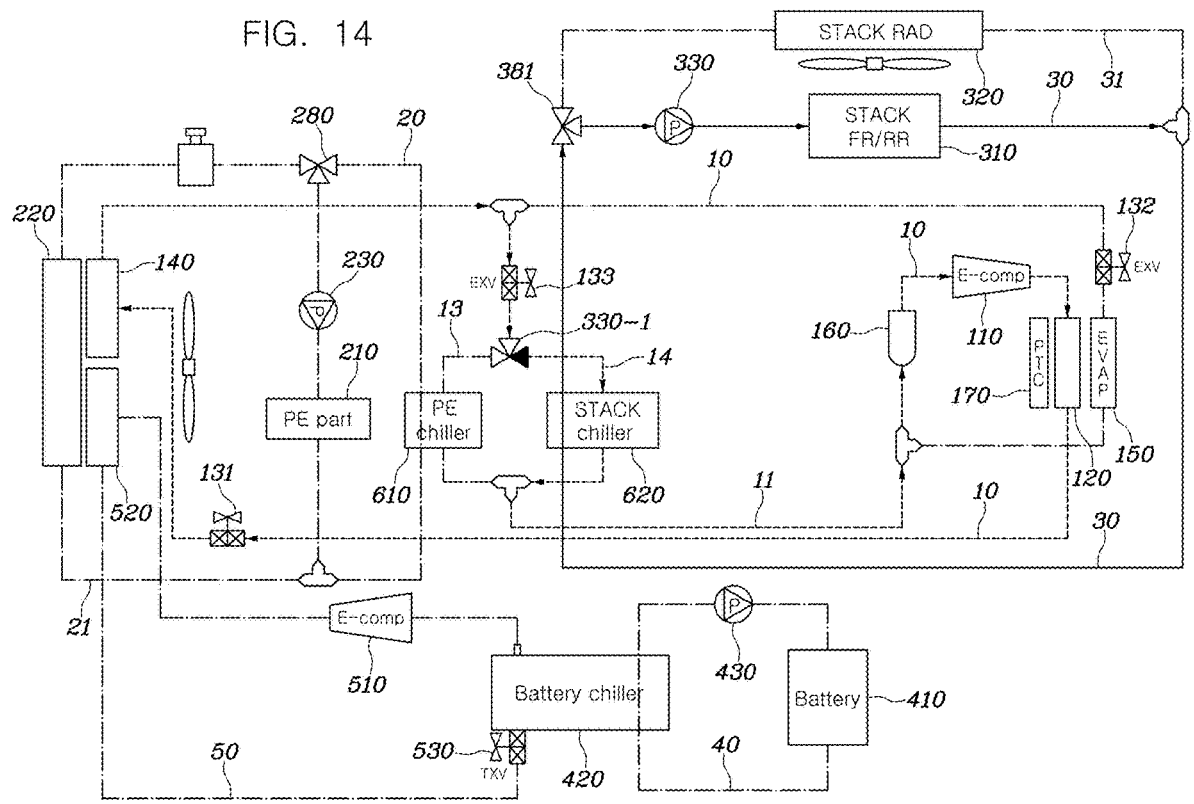
FIG. 14 is a diagram showing the operation of an integrated thermal management system for a fuel cell vehicle according to a sixth embodiment of the present disclosure.
Figure 15:
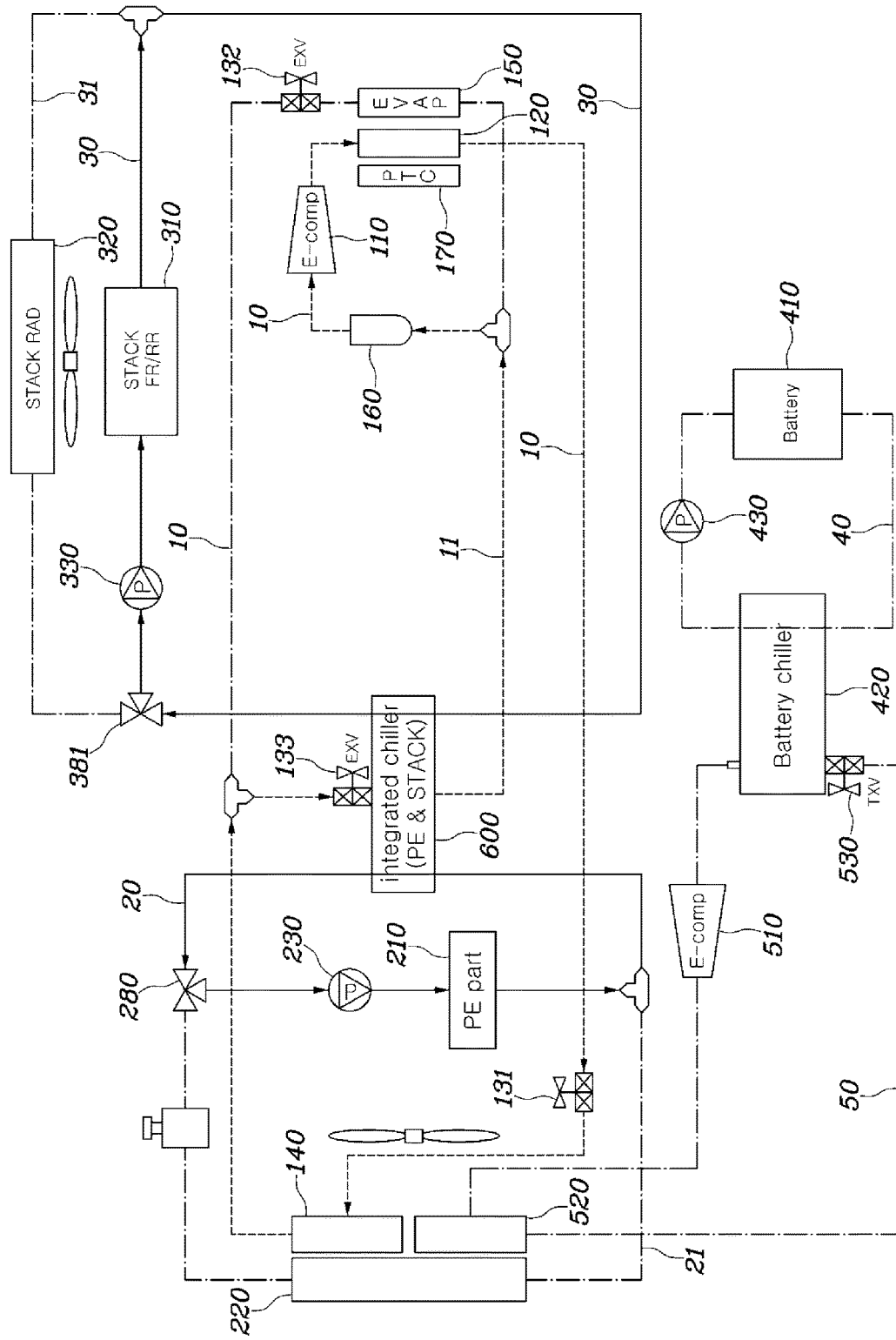
FIG. 15 is a diagram showing the operation of an integrated thermal management system for a fuel cell vehicle according to a seventh embodiment of the present disclosure.

FIGS. 12 and 13 are diagrams showing the operation of an integrated thermal management system for a fuel cell vehicle according to a fifth embodiment of the present disclosure. FIG. 14 is a diagram showing the operation of an integrated thermal management system for a fuel cell vehicle according to a sixth embodiment of the present disclosure. FIG. 15 is a diagram showing the operation of an integrated thermal management system for a fuel cell vehicle according to a seventh embodiment of the present disclosure.

The present disclosure relates to an integrated thermal management system for a fuel cell vehicle, which basically includes a fuel cell 310 for generating driving force of the vehicle. The fuel cell generates electrical energy through reaction between hydrogen and oxygen in the air. Because this reaction is heat generation reaction, the fuel cell needs to be cooled using coolant or the like. Meanwhile, in the case in which the coolant and the membrane electrode of the fuel cell freeze due to long-term parking or the like in winter, cold startup is needed. To this end, it is necessary to rapidly raise the temperature of the fuel cell in the beginning stage of cold startup.

The fuel cell vehicle is also equipped with a high-voltage battery. The power generated by the fuel cell 310 is used to drive a motor, or is charged in a battery 410. In some cases, the fuel cell 310 may be monitored using the battery. The battery 410 needs to be cooled in summer, and the temperature thereof needs to be raised in winter. Mild cooling using coolant or the like is performed on an electric part for driving the motor.

In winter, the indoor space in the vehicle needs to be heated. In this case, it is necessary to increase heating efficiency through a heat pump system by absorbing the waste heat from the electric part 210, the waste heat from the fuel cell 310, or the heat from outside air.

As described above, in the case of a fuel cell vehicle, which is equipped with a fuel cell, a motor, and a battery, these components have different cooling/heating requirements. In order to meet all of the requirements, overall thermal management of the components of the vehicle is performed in an integrated manner. Accordingly, heat efficiency and efficiency of use of electricity are improved.

FIG. 1 is a diagram showing a thermal management system according to a first embodiment of the present disclosure. The integrated thermal management system for a fuel cell vehicle according to the present disclosure includes a fuel cell coolant line 30, which circulates first coolant through a fuel cell 310 generating electric power using hydrogen and air, a battery chiller 420 exchanging heat with a battery 410 using coolant, and an integrated chiller 600, an indoor air-conditioning refrigerant line 10, which circulates refrigerant through a first compressor 110 suctioning and compressing the refrigerant, an indoor condenser 120 provided in an indoor air-conditioning device to generate hot air and supply the same to an indoor space, an outdoor heat exchanger 140 performing heat exchange between outside air and the refrigerant, and the integrated chiller 600, and a battery refrigerant line 50, which circulates the refrigerant through a second compressor 510 suctioning and compressing the refrigerant, an outdoor condenser 520 performing heat exchange between the compressed refrigerant and outside air to dissipate heat, and the battery chiller 420.

The fuel cell 310 and a pump 330 are connected to the fuel cell coolant line 30. The fuel cell 310 may be provided with a fuel cell radiator 320, which is connected in parallel to the fuel cell 310. Specifically, in the fuel cell coolant line, the fuel cell radiator 320 is connected in parallel to the fuel cell 310 via a second valve 381 (refer to reference numeral 31). Therefore, when the waste heat from the fuel cell 310 is not needed, the fuel cell 310 exchanges coolant with the fuel cell radiator 320 through the second valve 381, and thus is capable of being cooled independently.

The battery chiller 420 is connected to the fuel cell coolant line 30. The integrated chiller 600 is also connected to the fuel cell coolant line 30. Accordingly, the temperature of the fuel cell 310 may be lowered or raised more rapidly using the above chillers. In addition, the waste heat from the fuel cell 310 may be transferred to the chillers, thereby increasing indoor heating efficiency. The coolant in the fuel cell coolant line 30 may flow through the fuel cell 310, the battery chiller 420, and the integrated chiller 600 in that order.

FIG. 4 illustrates an integrated thermal management system according to a second embodiment of the present disclosure. According to the second embodiment, the battery chiller 420 may be connected in parallel to the fuel cell coolant line 30 via a first valve 382. Specifically, in the fuel cell coolant line 30, the battery chiller 420 may be connected in parallel to a point between the fuel cell 310 and the integrated chiller 600 via the first valve 382. Accordingly, the coolant that has passed through the fuel cell 310 may bypass the battery chiller 420, and the fuel cell 310 and the battery 410 may be independently thermally managed so that the fuel cell 310 and the battery 410 do not affect each other.

In addition, a battery coolant line 40, in which second coolant circulates through the battery chiller 420 and the battery 410, is provided, and thus it is possible to cool the battery or to collect the waste heat from the battery.

The indoor air-conditioning refrigerant line 10 is a line in which the refrigerant circulates through the first compressor 110 suctioning and compressing the refrigerant, the indoor condenser 120 provided in the indoor air-conditioning device to generate hot air and supply the same to an indoor space, the outdoor heat exchanger 140 performing heat exchange between outside air and the refrigerant, and the integrated chiller 600. As illustrated, the indoor air-conditioning refrigerant line 10 may be managed using separate refrigerant different from that in a battery refrigerant line 50, which will be described later. Accordingly, the indoor air-conditioning device and the battery may be independently thermally managed.

In detail, in the indoor air-conditioning refrigerant line 10, the refrigerant is compressed by the first compressor 110, and is discharged therefrom. The compressed refrigerant first passes through the indoor condenser 120 of the indoor air-conditioning device. The indoor air-conditioning device is provided with the indoor condenser 120, an evaporator 150, and a mix door (not shown) for controlling the amount of air flowing through the indoor condenser 120 and the evaporator 150. During the heating operation, the mix door may be controlled so that air flows only through the indoor condenser 120, and during the cooling operation, the mix door may be controlled so that air flows only through the evaporator 150. Accordingly, in summer, although the high-temperature refrigerant flows through the indoor condenser 120, the air flows only through the evaporator 150 due to the mix door, and thus cooling performance is not affected. In addition, the indoor air-conditioning device is provided with a PTC heater 170 in order to enhance heating performance.

The refrigerant that has passed through the indoor condenser 120 is supplied to the outdoor heat exchanger 140 through an expansion valve 131. When the expansion valve 131 performs an expansion function, the outdoor heat exchanger 140 absorbs heat from the outside air, and when the expansion valve 131 is completely opened, expansion does not occur, and thus condensing is performed using the outside air. The refrigerant that has passed through the outdoor heat exchanger 140 is divided into two streams, which are introduced into the integrated chiller 600 and the evaporator 150. The integrated chiller 600 is provided with an expansion valve 133, and the evaporator 150 is provided with an expansion valve 132. Each of the expansion valves is capable of performing an expansion function and of being opened. The indoor air-conditioning refrigerant line 10 includes a collection line 11. The refrigerant that has passed through the integrated chiller 600 is collected in the collection line 11 of the indoor air-conditioning refrigerant line 10, and mixes with the refrigerant that has passed through the evaporator 150. The mixture of the two refrigerants is supplied to the first compressor 110 through an accumulator 160. The integrated chiller 600 is connected in parallel to the evaporator 150 through the collection line 11 of the indoor air-conditioning refrigerant line 10.

The battery refrigerant line 50 is a line in which the refrigerant circulates through a second compressor 510 suctioning and compressing the refrigerant, an outdoor condenser 520 performing heat exchange between the compressed refrigerant and outside air to dissipate heat, an expansion valve 530, and the battery chiller 420. This is an independent refrigerant line, and is used to cool the battery chiller 420 as needed. The cooled battery chiller 420 serves to cool the battery 410 or the fuel cell 310.

In some cases, an electric part 210 of the vehicle needs to be cooled using outside air. To this end, there is provided an electric part coolant line 20, in which third coolant is circulated through the electric part 210 of the vehicle and the integrated chiller 600 by a pump 230. In addition, in the electric part coolant line 20, an electric part radiator 220 may be connected in parallel to the electric part 210 of the vehicle via a third valve 280 (refer to reference numeral 21).

Accordingly, the waste heat from the electric part 210 may be collected through the integrated chiller 600, and may be used for heating operation. Alternatively, the heat generated from the electric part 210 may be dissipated through the electric part radiator 220. This switching between modes may be performed by controlling the third valve 280.

FIG. 2 illustrates the case in which the integrated thermal management system shown in FIG. 1 performs indoor cooling. In this case, the first compressor 110 in the indoor air-conditioning refrigerant line 10 is driven, and the indoor condenser 120 is heated. However, the mix door of the indoor air-conditioning device is controlled such that heated air is not introduced into the indoor space. The heat of the compressed and heated refrigerant is dissipated through the outdoor heat exchanger 140, and the refrigerant is divided into two streams, which are introduced into the integrated chiller 600 and the evaporator 150. The two streams of refrigerant are respectively expanded by the expansion valves 132 and 133 of the integrated chiller 600 and the evaporator 150. Accordingly, indoor cooling is achieved through the evaporator 150.

In addition, the fuel cell 310 is cooled by the integrated chiller 600. The coolant, which circulates through the fuel cell coolant line 30, is cooled by the integrated chiller 600, and the cooled coolant cools the fuel cell 310. In addition, the battery 410 is also cooled by the battery refrigerant line 50 and circulation of the coolant in the battery coolant line 40 by the pump 430. Here, the coolant in the fuel cell coolant line 30 is secondarily cooled by the battery chiller 420 and the integrated chiller 600. Accordingly, the fuel cell 310 is sufficiently cooled.

Cooling of the fuel cell 310 is also performed simultaneously with indoor cooling. In the fuel cell cooling mode, both the first compressor 110 and the second compressor 510 are driven, and the coolant that has passed through the fuel cell 310 in the fuel cell coolant line 30 is cooled by the battery chiller 420 and the integrated chiller 600.

In the case of the second embodiment shown in FIG. 4, the first valve 382 is controlled such that the coolant in the fuel cell coolant line 30 bypasses the battery chiller 420, rather than passing through the battery chiller 420. Accordingly, cooling of the fuel cell 310 and cooling of the battery 410 are independently performed. Since the fuel cell 310 and the battery 410 are individually cooled, it is possible to prevent unnecessary consumption of energy.

FIG. 3 illustrates the case in which the integrated thermal management system according to the first embodiment of the present disclosure performs indoor heating. In this case, heating may be achieved through a heat pump system by collecting the waste heat from the electric part 210, the waste heat from the battery 410, the waste heat from the fuel cell 310, or the heat from the outside air. First, the coolant that has passed through the electric part 210 via the third valve 280 exchanges heat with the integrated chiller 600, rather than the radiator 220. Accordingly, the refrigerant in the indoor air-conditioning refrigerant line 10 is heated. The heated refrigerant is introduced into and compressed by the first compressor 110, and thus is converted into a high-temperature refrigerant. The high-temperature refrigerant flows into the indoor condenser 120, thereby heating the indoor space. The refrigerant that has passed through the indoor condenser 120 is expanded by the expansion valve 131, is introduced into the outdoor heat exchanger 140 to absorb the heat from the outside air, and further absorbs heat through the integrated chiller 600. Accordingly, the heat pump system is efficiently implemented.

The waste heat from the fuel cell 310 and the waste heat from the battery 410 may be collected through the fuel cell coolant line 30, and the collected waste heat may be transferred to the integrated chiller 600. As a result, the refrigerant flowing through the integrated chiller 600 may collect all of the heat from the outside air, the waste heat from the electric part, the waste heat from the fuel cell, and the waste heat from the battery. In this case, it is possible to select whether to collect the waste heat from the electric part 210 by controlling the third valve 280 or the pump 230. It is possible to select whether to absorb the heat from the outside air by controlling the expansion valve 131. It is possible to select whether to collect the waste heat from the fuel cell 310 by controlling the second valve 381 or the pump 330. It is possible to select whether to collect the waste heat from the battery by controlling the pump 430 provided in the battery coolant line 40. That is, four kinds of heat sources may be independently selected for operation of the heat pump system. Accordingly, heating may be realized at optimal efficiency according to the situation. In this state, when the expansion valve 132 is fully opened so that the refrigerant that has passed through the outdoor heat exchanger 140 is introduced into the evaporator 150, an indoor dehumidification mode may be implemented using both the indoor condenser 120 and the evaporator 150.

FIGS. 5 to 7 are diagrams showing the operation of an integrated thermal management system for a fuel cell vehicle according to a third embodiment of the present disclosure. According to the third embodiment, the integrated chiller 600 may be divided into an electric part chiller 610 and a fuel cell chiller 620, which are connected in parallel to each other via a fourth valve 330-1 in the refrigerant line, the electric part chiller 610 may be connected to the electric part coolant line 20, and the fuel cell chiller 620 may be connected to the fuel cell coolant line 30. Since the integrated chiller 600 is divided into the electric part chiller 610 and the fuel cell chiller 620, and the electric part chiller 610 and the fuel cell chiller 620 are connected in parallel to each other via respective lines 13 and 14, it is possible to select any one of the electric part chiller 610 and the fuel cell chiller 620, thus making it possible to independently implement more various modes.

As shown in FIG. 5, in the case of indoor cooling, the expanded refrigerant in the indoor air-conditioning refrigerant line 10 flows only through the fuel cell chiller 620, thereby cooling the indoor space through the evaporator 150 and cooling the fuel cell through the fuel cell chiller 620. In addition, the electric part 210 is cooled through the electric part radiator 220, and the battery 410 is cooled through the battery refrigerant line 50 and the battery coolant line 40. Particularly, the first coolant in the fuel cell coolant line 30 is dual-cooled by the battery chiller 420 and the fuel cell chiller 620, thereby effectively cooling the fuel cell 310. In the case in which mild cooling of the fuel cell 310 is desired, the first coolant circulates only through the fuel cell 310 and the fuel cell radiator 320 through the second valve 381, and the expansion valve 133 is closed so that the refrigerant in the indoor air-conditioning refrigerant line 10 does not flow to the fuel cell chiller 620 and flows to the evaporator 150.

FIG. 6 illustrates indoor heating, in which the waste heat from the electric part 210 is collected through the electric part chiller 610 and heating is performed through the indoor condenser 120. In this case, the expanded refrigerant in the indoor air-conditioning refrigerant line 10 flows only to the electric part chiller 610, thereby collecting waste heat. The first coolant in the fuel cell coolant line 30 circulates between the fuel cell 310 and the battery chiller 420, and raises the temperature of the battery 410 using the waste heat from the fuel cell 310. The shortage of indoor heating capacity may be supplemented by driving the PTC heater 170. In addition, in this case, the refrigerant may be expanded by the expansion valve 131, and may then be introduced into the outdoor heat exchanger 140. When the expansion valve 132 adjacent to the evaporator is fully opened, the refrigerant discharged from the outdoor heat exchanger 140 is introduced into the evaporator, thereby implementing the indoor dehumidification mode.

FIG. 7 illustrates a heating mode, in which the heat from the outside air is collected and the waste heat from the fuel cell 310 is collected through the fuel cell chiller 620 in order to heat the indoor space. This heating mode may be used when the temperature of the electric part 210 is not high. When the temperature of the fuel cell 310 is high, the temperature of the battery 410 may be raised using the waste heat from the fuel cell 310. When the temperature of the fuel cell 310 is low, the waste heat from the battery 410 may be collected and may be transferred to the fuel cell chiller 620.

FIGS. 8 to 11 are diagrams showing the operation of an integrated thermal management system for a fuel cell vehicle according to a fourth embodiment of the present disclosure. According to the fourth embodiment, the integrated chiller 600 may be divided into a fuel cell chiller 620 and an electric part chiller 610, which are connected in series to each other, the electric part chiller 610 may be connected to the electric part coolant line 20, and the fuel cell chiller 620 may be connected to the fuel cell coolant line 30. A fifth valve 183 may be provided upstream of the integrated chiller, and a branch line 15, which branches from a point between the indoor condenser 120 and the outdoor heat exchanger 140 and is connected to the fifth valve 183, may be provided in the refrigerant line. A bypass line 12, which bypasses the integrated chiller, may be connected to the fifth valve 183, and the bypass line 12 may be connected to the indoor air-conditioning refrigerant line 10 at a point upstream of the first compressor 110. The fuel cell chiller 620 may be disposed upstream of the electric part chiller 610, whereby the refrigerant discharged from the fuel cell chiller 620 may be introduced into the electric part chiller 610.

In order to realize the above structure, the fifth valve 183 may be implemented as a multi-way valve, e.g. a four-way valve, as shown in the drawings.

Figure 8:
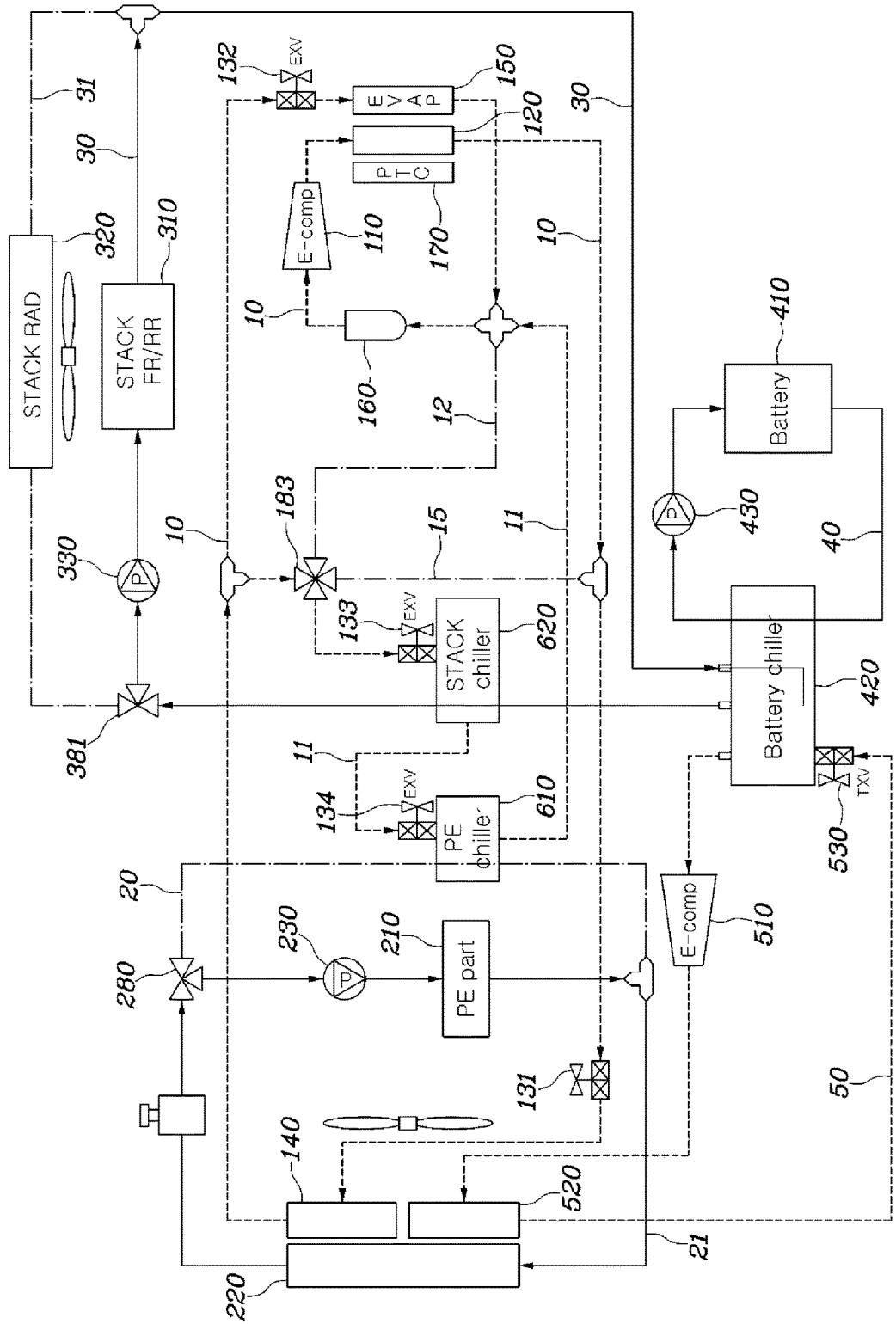
FIGS. 8, 9, 10, and 11 are diagrams showing the operation of an integrated thermal management system for a fuel cell vehicle according to a fourth embodiment of the present disclosure.

As shown in FIG. 8, indoor cooling is implemented using the above structure. Cooling of the electric part 210 is separately performed through the electric part radiator 220. Since the refrigerant is expanded by the expansion valve 133 at a point upstream of the fuel cell chiller 620, the fuel cell 310 may be cooled using the fuel cell chiller 620. The battery 410 may be cooled through the battery refrigerant line 50 and the battery coolant line 40.

Figure 9:
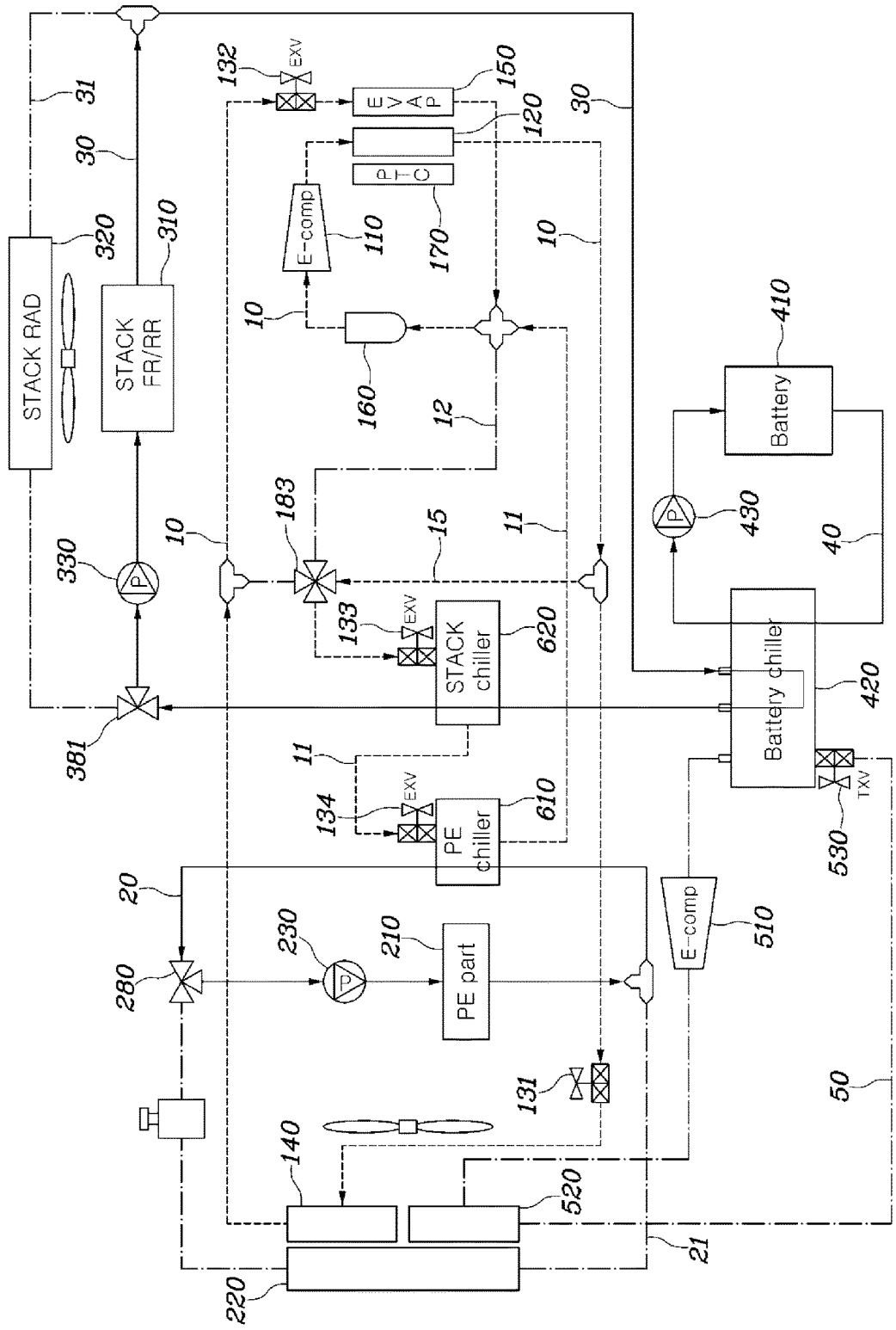

In the case of heating, shown in FIG. 9, the heat from the outside air may be collected through the outdoor heat exchanger 140, and the waste heat from the electric part 210 may be collected through the electric part chiller 610. The waste heat from the fuel cell 310 may be collected through the fuel cell chiller 620. The waste heat from the battery may be collected through the battery chiller 420. Accordingly, heating efficiency may be maximized. The refrigerant in the indoor air-conditioning refrigerant line 10 may dissipate heat to the indoor space through the indoor condenser 120, may be expanded by the expansion valve 133 through control of the branch line 15 and the fifth valve 183, and then may collect the waste heat through both the fuel cell chiller 620 and the electric part chiller 610. In this case, the expansion valve 133 of the fuel cell chiller 620 may be opened, and the expansion valve 134 of the electric part chiller 610 may perform an expansion function. Accordingly, only the waste heat from the electric part 210 may be collected to be used for heating, and the fuel cell 310 may absorb heat through the battery chiller 420 or the fuel cell chiller 620, whereby the temperature of the fuel cell 310 may be raised during cold startup. In addition, the expansion valve 132 adjacent to the evaporator may be fully opened so that the refrigerant expanded by the expansion valve 131 is introduced into the evaporator 150 via the outdoor heat exchanger 140, thereby making it possible to implement the indoor dehumidification mode.

Figure 10:
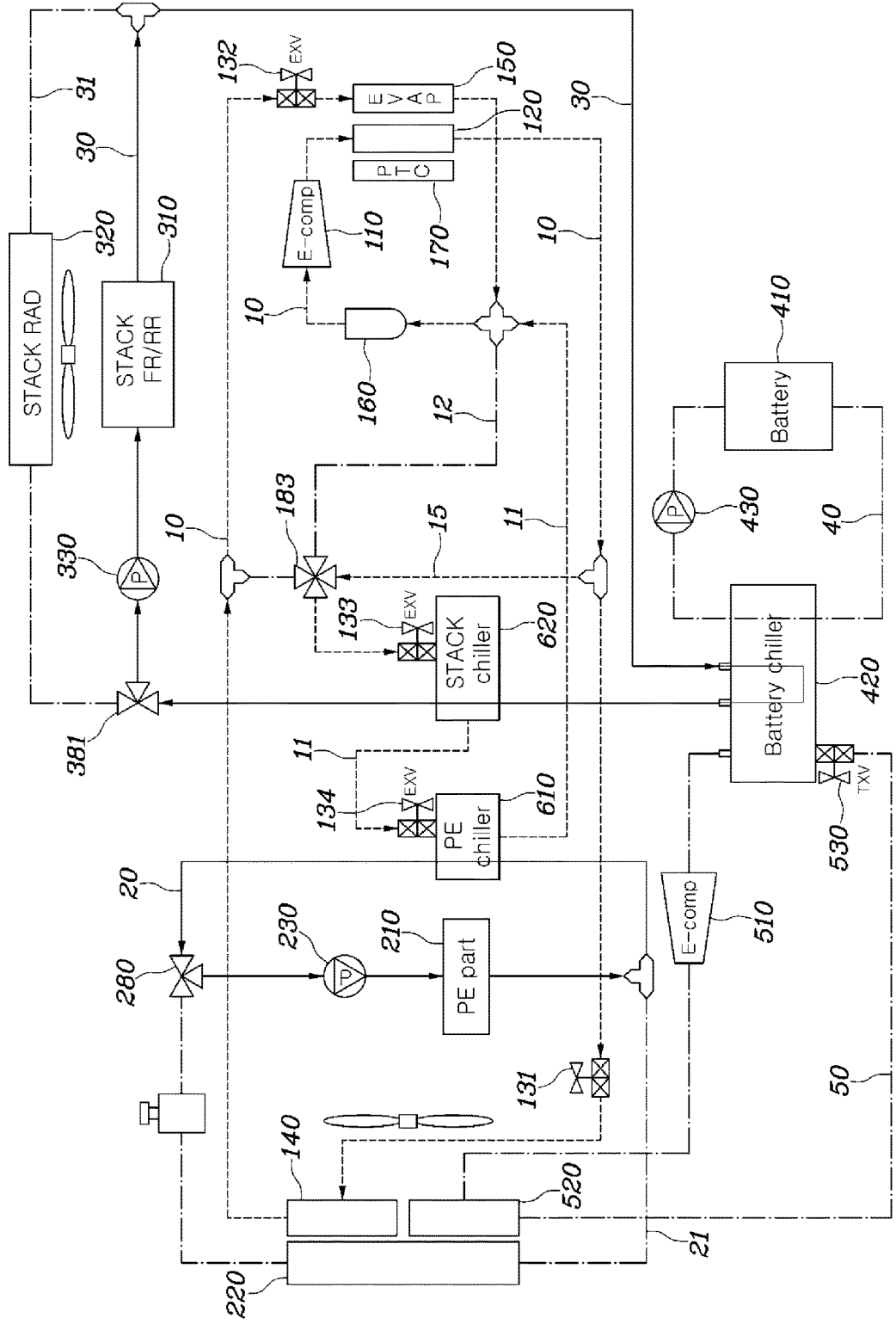

When it is not necessary to increase the temperature of the battery 410, as shown in FIG. 10, operation of the pump 430 in the battery coolant line is stopped, and operation of the second compressor 510 in the battery refrigerant line 50 is stopped. Accordingly, the first coolant passes through the battery chiller 420, but no heat exchange occurs.

Figure 11:
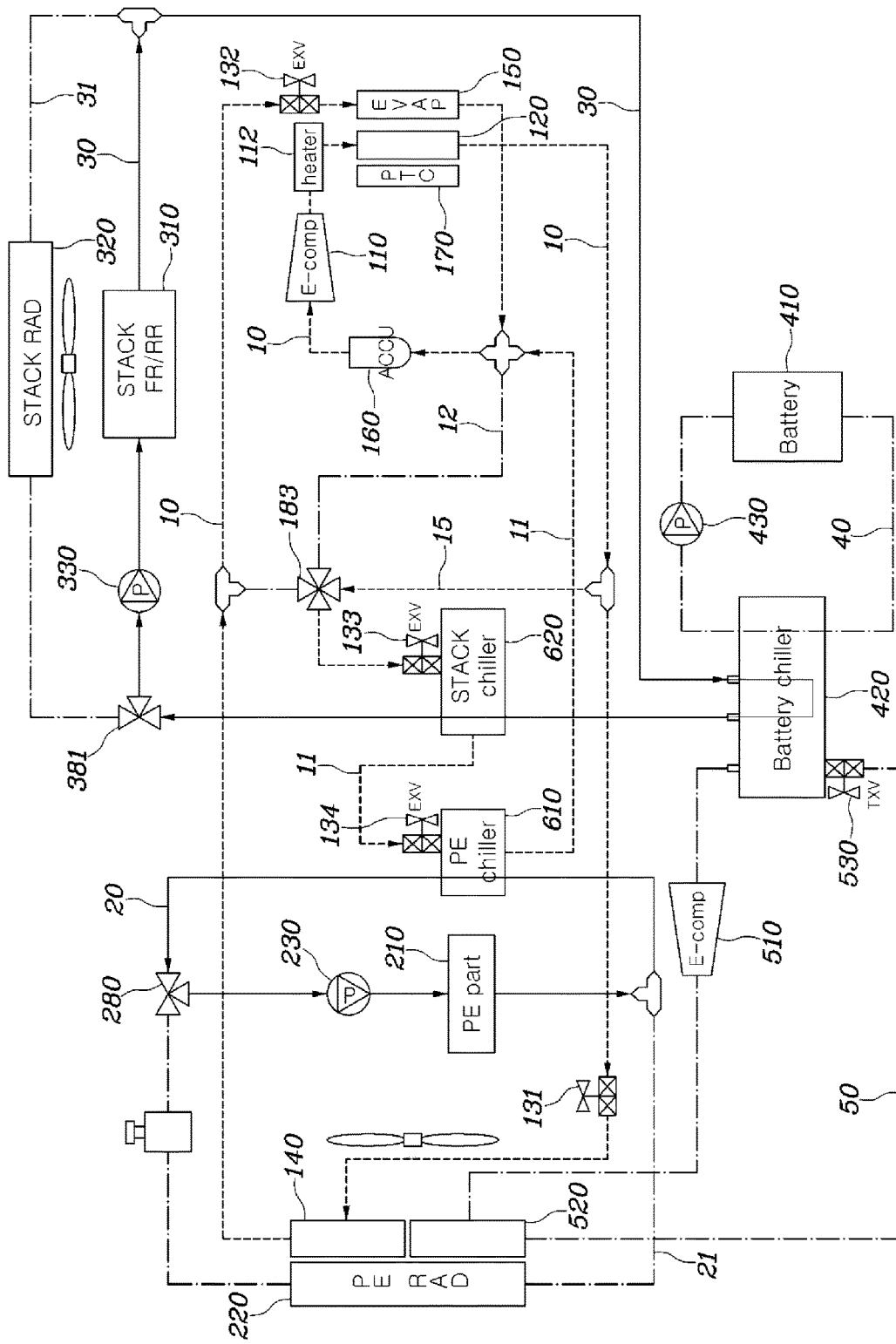

FIG. 11 illustrates the case in which a refrigerant heater 112 is provided in the indoor air-conditioning refrigerant line 10. In the indoor air-conditioning refrigerant line 10, the refrigerant heater 112 may be provided between the first compressor 110 and the indoor condenser 120 of the indoor air-conditioning device. In this case, the refrigerant heated by the refrigerant heater 112 is introduced into the indoor condenser 120. Accordingly, stronger heating may be implemented. In addition, since the high-temperature refrigerant is introduced into the fuel cell chiller 620, the temperature of the fuel cell 310 may be raised during cold startup. To this end, the expansion valve 133 of the fuel cell chiller 620 is opened in order to induce simple heat exchange, the expansion valve 131 of the outdoor heat exchanger 140 performs an expansion function, and the expansion valve 134 of the electric part chiller 610 performs an expansion function in order to actively absorb heat. In this way, it is advantageous to increase the efficiency of the heat pump system.

FIGS. 12 and 13 are diagrams showing the operation of an integrated thermal management system for a fuel cell vehicle according to a fifth embodiment of the present disclosure. According to the fifth embodiment, the coolant of the fuel cell and the coolant of the battery chiller are separated from each other. Accordingly, during indoor heating, the heat from the outside air may be collected through the outdoor heat exchanger 140, and the waste heat from the electric part 210 may be collected through the electric part chiller 610. In addition, the waste heat from the fuel cell 310 may be collected through the fuel cell chiller 620.

The refrigerant in the indoor air-conditioning refrigerant line 10 may dissipate heat to the indoor space through the indoor condenser 120, may be expanded by the expansion valve 133 through control of the branch line 15 and the fifth valve 183, and then may collect the waste heat through both the fuel cell chiller 620 and the electric part chiller 610. In this case, the expansion valve 133 of the fuel cell chiller 620 may be opened, and the expansion valve 134 of the electric part chiller 610 may perform an expansion function. Accordingly, only the waste heat from the electric part 210 may be collected to be used for heating, and the fuel cell 310 may absorb heat through the fuel cell chiller 620, whereby the temperature of the fuel cell 310 may be raised during cold startup. In addition, as shown in FIG. 12, the expansion valve 132 adjacent to the evaporator may be fully opened so that the refrigerant expanded by the expansion valve 131 is introduced into the evaporator 150 via the outdoor heat exchanger 140, thereby making it possible to implement the indoor dehumidification mode at the same time.

FIG. 13 illustrates the case in which a refrigerant heater 112 is provided in the indoor air-conditioning refrigerant line 10 shown in FIG. 12. In the indoor air-conditioning refrigerant line 10, the refrigerant heater 112 may be provided between the first compressor 110 and the indoor condenser 120 of the indoor air-conditioning device. In this case, the refrigerant heated by the refrigerant heater 112 is introduced into the indoor condenser 120. Accordingly, stronger heating may be implemented. In addition, since the high-temperature refrigerant is introduced into the fuel cell chiller 620, the temperature of the fuel cell 310 may be raised during cold startup. To this end, the expansion valve 133 of the fuel cell chiller 620 is opened (fully opened) in order to induce simple heat exchange, the expansion valve 131 of the outdoor heat exchanger 140 performs an expansion function, and the expansion valve 134 of the electric part chiller 610 performs an expansion function in order to actively absorb heat. In this way, it is advantageous to increase the efficiency of the heat pump system.

FIG. 14 is a diagram showing the operation of an integrated thermal management system for a fuel cell vehicle according to a sixth embodiment of the present disclosure. According to the sixth embodiment, the integrated chiller may be divided into an electric part chiller 610 and a fuel cell chiller 620, which are connected in parallel to each other via a fourth valve 330-1 in the refrigerant line, the electric part chiller 610 may be connected to the electric part coolant line 20, and the fuel cell chiller 620 may be connected to the fuel cell coolant line 30. Since the integrated chiller is divided into the electric part chiller 610 and the fuel cell chiller 620, and the electric part chiller 610 and the fuel cell chiller 620 are connected in parallel to each other via respective lines 13 and 14, it is possible to select any one of the electric part chiller 610 and the fuel cell chiller 620, thus making it possible to independently implement more various modes.

FIG. 14 illustrates an indoor heating mode, in which the heat from the outside air is collected and the waste heat from the fuel cell 310 is collected through the fuel cell chiller 620 in order to heat the indoor space. This heating mode may be used when the temperature of the electric part 210 is not high.

Alternatively, indoor heating, in which the waste heat from the electric part 210 is collected through the electric part chiller 610 and heating is performed through the indoor condenser 120, may be implemented. In this case, the expanded refrigerant in the indoor air-conditioning refrigerant line 10 flows only to the electric part chiller 610, thereby collecting waste heat. The shortage of indoor heating capacity may be supplemented by driving the PTC heater 170. In addition, in this case, the refrigerant may be expanded by the expansion valve 131, and may then be introduced into the outdoor heat exchanger 140. When the expansion valve 132 adjacent to the evaporator is fully opened, the refrigerant discharged from the outdoor heat exchanger 140 is introduced into the evaporator, thereby implementing the indoor dehumidification mode.

FIG. 15 is a diagram showing the operation of an integrated thermal management system for a fuel cell vehicle according to a seventh embodiment of the present disclosure. According to the seventh embodiment, heating may be achieved through a heat pump system by collecting the waste heat from the electric part 210, the waste heat from the fuel cell 310, or the heat from the outside air. First, the coolant that has passed through the electric part 210 via the third valve 280 exchanges heat with the integrated chiller 600, rather than the radiator 220. Accordingly, the refrigerant in the indoor air-conditioning refrigerant line 10 is heated. The heated refrigerant is introduced into and compressed by the first compressor 110, and thus is converted into a high-temperature refrigerant. The high-temperature refrigerant flows into the indoor condenser 120, thereby heating the indoor space. The refrigerant that has passed through the indoor condenser 120 is expanded by the expansion valve 131, is introduced into the outdoor heat exchanger 140 to absorb the heat from the outside air, and further absorbs heat through the integrated chiller 600. Accordingly, the heat pump system is efficiently implemented.

The waste heat from the fuel cell 310 may be collected through the fuel cell coolant line 30, and the collected waste heat may be transferred to the integrated chiller 600. As a result, the refrigerant flowing through the integrated chiller 600 may collect all of the heat from the outside air, the waste heat from the electric part, and the waste heat from the fuel cell. In this case, it is possible to select whether to collect the waste heat from the electric part 210 by controlling the third valve 280 or the pump 230. It is possible to select whether to absorb the heat from the outside air by controlling the expansion valve 131. It is possible to select whether to collect the waste heat from the fuel cell 310 by controlling the second valve 381 or the pump 330. That is, three kinds of heat sources may be independently selected for operation of the heat pump system. Accordingly, heating may be realized at optimal efficiency according to the situation. In this state, when the expansion valve 132 is fully opened so that the refrigerant that has passed through the outdoor heat exchanger 140 is introduced into the evaporator 150, the indoor dehumidification mode may be implemented using both the indoor condenser 120 and the evaporator 150.

As is apparent from the above description, according to the integrated thermal management system for a fuel cell vehicle of the present disclosure, it is possible to implement various heat exchange modes using refrigerant for indoor air conditioning, coolant for the electric part, coolant for the fuel cell, coolant for the battery, and refrigerant for the battery, thereby improving the overall energy efficiency of the vehicle.

Although specific embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. An integrated thermal management system for a fuel cell vehicle, the integrated thermal management system comprising:
   a fuel cell coolant line configured to circulate a first coolant through a fuel cell generating electric power using hydrogen and air, a fuel cell radiator cooling the fuel cell, a battery chiller exchanging heat with a battery, and an integrated chiller;
   an indoor air-conditioning refrigerant line configured to circulate a first refrigerant through a first compressor configured to suction and compress the first refrigerant, an indoor condenser provided in an indoor air-conditioning device configured to generate hot air and supply the hot air to an indoor space, an outdoor heat exchanger configured to perform heat exchange between outside air and the first refrigerant, and the integrated chiller; and
   a battery refrigerant line configured to circulate a second refrigerant through a second compressor configured to suction and compress the second refrigerant, an outdoor condenser configured to perform heat exchange between the compressed second refrigerant and outside air to dissipate heat, and the battery chiller;
   wherein the fuel cell is cooled by at least one of the integrated chiller, the battery chiller, or the fuel cell radiator.

2. The integrated thermal management system according to claim 1, wherein, in the fuel cell coolant line, the battery chiller is connected in parallel to a point between the fuel cell and the integrated chiller via a first valve.

3. The integrated thermal management system according to claim 1, wherein, in the fuel cell coolant line, a fuel cell radiator is connected in parallel to the fuel cell via a second valve, and
   wherein the integrated thermal management system further comprises:

a battery coolant line configured to circulate a second coolant through the battery chiller and the battery.

4. The integrated thermal management system according to claim 1, further comprising:
an electric part coolant line configured to circulate a second coolant through a vehicle electric part and the integrated chiller.

5. The integrated thermal management system according to claim 4, wherein, in the electric part coolant line, an electric part radiator is connected in parallel to the vehicle electric part via a valve.

6. The integrated thermal management system according to claim 4, wherein the integrated chiller comprises an electric part chiller and a fuel cell chiller, connected in parallel to each other via a valve in a refrigerant line,
wherein the electric part chiller is connected to the electric part coolant line, and
wherein the fuel cell chiller is connected to the fuel cell coolant line.

7. The integrated thermal management system according to claim 1, wherein the integrated chiller and an evaporator are connected in parallel to each other between the outdoor heat exchanger and the first compressor in the indoor air-conditioning refrigerant line.

8. The integrated thermal management system according to claim 4, wherein the integrated chiller comprises a fuel cell chiller and an electric part chiller, connected in series to each other,
wherein the electric part chiller is connected to the electric part coolant line,
wherein the fuel cell chiller is connected to the fuel cell coolant line,
wherein a valve is provided upstream of the integrated chiller, and
wherein a branch line, branching from a point between the indoor condenser and the outdoor heat exchanger and connected to the valve, is provided in a refrigerant line.

9. The integrated thermal management system according to claim 8, further comprising:
a bypass line bypassing the integrated chiller and connected to the valve,
wherein the bypass line is connected to the indoor air-conditioning refrigerant line at a point upstream of the first compressor.

10. The integrated thermal management system according to claim 8, wherein the fuel cell chiller is disposed upstream of the electric part chiller, and
wherein refrigerant discharged from the fuel cell chiller is introduced into the electric part chiller.

11. The integrated thermal management system according to claim 1, wherein the first coolant in the fuel cell coolant line flows through the fuel cell, the battery chiller, and the integrated chiller, in that order.

12. The integrated thermal management system according to claim 1, wherein, in the indoor air-conditioning refrigerant line, a refrigerant heater is provided between the first compressor and the indoor condenser of the indoor air-conditioning device.

13. The integrated thermal management system according to claim 1, wherein, in a fuel cell cooling mode, both the first compressor and the second compressor are driven, and the first coolant, having passed through the fuel cell in the fuel cell coolant line, is cooled by the battery chiller and the integrated chiller.

14. The integrated thermal management system according to claim 1, wherein, in an indoor heating mode, the first compressor is driven, and refrigerant, having passed through the indoor condenser in the indoor air-conditioning refrigerant line, absorbs heat through the outdoor heat exchanger and the integrated chiller.

15. The integrated thermal management system according to claim 3, wherein, in a battery-temperature-increasing mode, the second coolant circulates through the battery coolant line, and the first coolant, having passed through the fuel cell in the fuel cell coolant line, dissipates heat through the battery chiller.

16. The integrated thermal management system according to claim 6, wherein, in a fuel cell cooling mode, both the first compressor and the second compressor are driven, and the first coolant, having passed through the fuel cell in the fuel cell coolant line, is cooled by the battery chiller and the fuel cell chiller.

17. The integrated thermal management system according to claim 6, wherein, in an indoor heating mode, the first compressor is driven, and refrigerant, having passed through the indoor condenser in the indoor air-conditioning refrigerant line, absorbs heat through the outdoor heat exchanger, and absorbs heat while flowing through the fuel cell chiller via the valve.

18. The integrated thermal management system according to claim 6, wherein, in an indoor heating mode, the first compressor is driven, refrigerant, having passed through the indoor condenser in the indoor air-conditioning refrigerant line, absorbs heat through the outdoor heat exchanger and absorbs heat while flowing through the electric part chiller via the valve, and coolant, having passed through the fuel cell in the fuel cell coolant line, dissipates heat through the battery chiller.

19. The integrated thermal management system according to claim 9, wherein, in an indoor heating mode, the first compressor is driven, a portion of refrigerant, having passed through the indoor condenser in the indoor air-conditioning refrigerant line, absorbs heat through the outdoor heat exchanger, and a remaining portion of the refrigerant absorbs heat while flowing through the fuel cell chiller and the electric part chiller via the branch line and the valve.

20. The integrated thermal management system according to claim 19, wherein, in the indoor heating mode, when a temperature of the fuel cell is below a predetermined value, refrigerant is not expanded in the fuel cell chiller, and is expanded in the electric part chiller.

21. An integrated thermal management system for a fuel cell vehicle, the integrated thermal management system comprising:
a fuel cell coolant line configured to circulate a first coolant through a fuel cell generating electric power using hydrogen and air, a fuel cell radiator cooling the fuel cell, and an integrated chiller;
an indoor air-conditioning refrigerant line configured to circulate a first refrigerant through a first compressor configured to suction and compress the first refrigerant, an indoor condenser provided in an indoor air-conditioning device to generate hot air and supply the hot air to an indoor space, an outdoor heat exchanger configured to perform heat exchange between outside air and the first refrigerant, and the integrated chiller;
a battery chiller configured to perform exchange heat with a battery; and
a battery refrigerant line configured to circulate a second refrigerant through a second compressor configured to suction and compress the second refrigerant, an outdoor condenser configured to perform heat exchange between the compressed second refrigerant and outside air to dissipate heat, and the battery chiller;

wherein the fuel cell is cooled by at least one of the integrated chiller or the fuel cell radiator.

22. The integrated thermal management system according to claim 21, further comprising:
an electric part coolant line configured to circulate a third coolant through a vehicle electric part and the integrated chiller.

23. The integrated thermal management system according to claim 22, wherein the integrated chiller comprises a fuel cell chiller and an electric part chiller, connected in series to each other,
wherein the electric part chiller is connected to the electric part coolant line,
wherein the fuel cell chiller is connected to the fuel cell coolant line,
wherein a valve is provided upstream of the integrated chiller, and
wherein a branch line, branching from a point between the indoor condenser and the outdoor heat exchanger and connected to the valve, is provided in a refrigerant line.

24. The integrated thermal management system according to claim 23, further comprising:
a bypass line bypassing the integrated chiller and connected to the fifth valve,
wherein the bypass line is connected to the indoor air-conditioning refrigerant line at a point upstream of the first compressor.

25. The integrated thermal management system according to claim 23, wherein the fuel cell chiller is disposed upstream of the electric part chiller, and
wherein refrigerant discharged from the fuel cell chiller is introduced into the electric part chiller.

26. The integrated thermal management system according to claim 23, wherein, in an indoor heating mode, the first compressor is driven, a portion of refrigerant, having passed through the indoor condenser in the indoor air-conditioning refrigerant line, absorbs heat through the outdoor heat exchanger, and a remaining portion of the refrigerant absorbs heat while flowing through the fuel cell chiller and the electric part chiller via the branch line and the valve.

27. The integrated thermal management system according to claim 26, wherein, in the indoor heating mode, when a temperature of the fuel cell is below a predetermined value, refrigerant is not expanded in the fuel cell chiller, and is expanded in the electric part chiller.

28. The integrated thermal management system according to claim 26, wherein, in the indoor air-conditioning refrigerant line, a refrigerant heater is provided between the first compressor and the indoor condenser of the indoor air-conditioning device, and
wherein, in the indoor heating mode, when a temperature of the fuel cell is below a predetermined value, the refrigerant heater is driven, and refrigerant is not expanded in the fuel cell chiller, and is expanded in the electric part chiller.

29. The integrated thermal management system according to claim 22, wherein the integrated chiller comprises an electric part chiller and a fuel cell chiller, connected in parallel to each other via a valve in a refrigerant line,
wherein the electric part chiller is connected to the electric part coolant line, and
wherein the fuel cell chiller is connected to the fuel cell coolant line.

* * * * *